United States Patent [19]

Müller

[11] 3,834,031

[45] Sept. 10, 1974

[54] APPARATUS FOR MEASURING THE THICKNESS OF PAPER SHEET STACKS OR THE LIKE

[75] Inventor: Hans Müller, Zofingen, Switzerland

[73] Assignee: Grapha Maschinenfabrik Hans Muller AG, Zofingen, Switzerland

[22] Filed: May 11, 1972

[21] Appl. No.: 252,417

[30] Foreign Application Priority Data
May 21, 1971 Switzerland.......................... 7450/71

[52] U.S. Cl.............. 33/174 R, 33/143 R, 209/88 S
[51] Int. Cl.......... G01b 5/06, B07c 1/10, B07c 5/04
[58] Field of Search.......... 33/143 R, 143 H, 143 L, 33/147 L, 174 R; 209/88 S, 88 R

[56] References Cited
UNITED STATES PATENTS

| | | | |
|---|---|---|---|
| 665,193 | 1/1901 | Dexter............................. | 209/88 S |
| 2,298,368 | 10/1942 | Goebel et al..................... | 209/88 S |
| 2,794,258 | 6/1957 | Danielsson....................... | 33/147 L |

FOREIGN PATENTS OR APPLICATIONS

| | | | |
|---|---|---|---|
| 845,505 | 6/1970 | Canada............................ | 209/88 S |

*Primary Examiner*—Louis R. Prince
*Assistant Examiner*—Richard R. Stearns
*Attorney, Agent, or Firm*—Michael S. Striker

[57] ABSTRACT

Apparatus for measuring the thickness of V-shaped stacks of paper sheets which are transported at equal intervals along the upper stretch of an endless chain has two scanning wheels one of which is located below and the other of which is located above the path for the stacks. The upper scanning wheel is lifted by successive stacks so that its position during engagement with a stack is indicative of the thickness of the thus engaged stack. The upper scanning wheel controls the position of a plate which can be received between two blades of a lever. The lever is pivotable by a cam which is driven in synchronism with the chain so that it allows the lever to assume a predetermined angular position when the scanning wheels engage a stack and when the thus engaged stack is of satisfactory thickness. Otherwise, the plate extends into the path of movement of one of the blades and prevents the lever from assuming its predetermined position. When the lever is free to assume its predetermined position, it actuates a switch or another suitable control device serving to regulate the operation of a processing machine for satisfactory stacks which have advanced beyond the scanning wheels. At least one of the scanning wheels, a balance beam for the plate and/or at least one of the blades on the lever is adjustable to allow for changes in setup of the measuring apparatus and/or to select the range of satisfactory thicknesses of tested stacks.

14 Claims, 3 Drawing Figures

APPARATUS FOR MEASURING THE THICKNESS OF PAPER SHEET STACKS OR THE LIKE

BACKGROUND OF THE INVENTION

The present invention relates to apparatus for measuring or gauging the thickness of moving stacks or piles of paper sheets or the like. More particularly, the invention relates to improvements in apparatus for measuring the thickness of stacked paper sheets or the like for the purpose of controlling the operation of one or more processing machines which receive freshly tested stacks and subject such stacks to one or more treatments, for example, to convert piles of loosely stacked paper sheets into pamphlets, brochures, periodicals, booklets, books or the like. Still more particularly, the invention relates to improvements in apparatus which can be used for testing of stacks of flat sheets and/or for testing of stacks of partially folded (such as V-shaped) sheets.

It is customary to transport stacks of paper sheets to a stapling, stitching or binding machine by means of an endless conveyor which supports stacks at predetermined intervals. Each stack is supposed to contain a predetermined number of sheets, for example, a number of sheets which, when stapled or stitched together, can constitute a complete pamphlet or a complete section of a book. It is desirable to measure or gauge the thickness of stacks before they reach a processing station in order to determine whether or not the thickness of stacks is satisfactory, i.e., whether or not each stack contains a requisite number of sheets and/or whether or not the sheets of a stack are properly arrayed prior to entry into a stapling or analogous processing machine.

SUMMARY OF THE INVENTION

An object of the invention is to provide a simple, reliable, rugged and versatile measuring or gauging apparatus which can determine the thickness of moving stacks with a desired degree of accuracy, which can control one or more processing machines or apparatus and/or which can effect automatic segregation or ejection of unsatisfactory stacks before such stacks reach the first or foremost processing station.

Another object of the invention is to provide a measuring apparatus which can be rapidly and accurately adjusted for testing of thicker or thinner stacks, which can be readily adjusted to select the range of acceptable thicknesses for successive stacks of a series, and which can be built into production lines in presently known book binding, pamphlet making or analogous plants.

A further object of the invention is to provide a measuring apparatus which can control the operation of one or more processing machines for stacks of paper sheets or the like in a fully automatic way as a function of the condition of tested stacks and which can be readily adjusted for testing of thicker or thinner stacks without necessitating any changes in the construction and/or mounting of means which controls the operation of processing machine or machines as a function of the thickness of tested stacks.

An additional object of the invention is to provide a measuring or gauging apparatus which occupies little room, which can treat the stacks gently without excessive deformation and/or smudging of sheets, and which can test a large number of stacks per unit of time so that the testing operation can be performed at the same speed at which the stacks must be fed into a modern book or pamphlet binding, stapling or like machine.

Still another object of the invention is to provide a measuring apparatus which allows for coarse as well as fine adjustment of its parts in order to change the setup for testing of thicker or thinner stacks and which is assembled of a relatively small number of simple, rugged and inexpensive components.

The invention resides in the provision of an apparatus for measuring the thickness of stacks of paper sheets or the like, particularly for measuring the thickness of substantially V-shaped stacks consisting of partially folded paper sheets and being ready to be converted into pamphlets, brochures, periodicals, books or the like. The apparatus comprises a preferably endless conveyor which serves to transport a series of preferably equidistant stacks along an elongated path toward, through and beyond a testing station, first and second preferably wheel-shaped scanning members mounted at the opposite sides of the path at the testing station in such a way that one scanning member is movable away from the other scanning member by successive stacks which enter the testing station so that its position is then a function of the thickness of the stack at the testing station, a lever or an analogous output member, a rotary cam or analogous means for moving the output member between first and second positions which the output member respectively assumes when the conveyor advances a stack beyond the testing station and when the conveyor transports a stack of satisfactory thickness through the testing station, and a measuring device including a preferably plate-like first portion which receives motion from the one scanning member so that its position when the one scanning member engages a stack at the testing station is a function of the thickness of the thus engaged stack. The measuring device further comprises a second portion which preferably includes two spaced apart blades provided on the output member and arranged to bypass the first portion of the measuring device and to thus allow the output member to move to its second position only when the position of the first portion of the measuring device is indicative of a stack of satisfactory thickness. Thus, when the position of the first portion of the measuring device is indicative of a stack of unsatisfactory thickness, the first portion prevents the output member from assuming its second position whereby the output member either actuates or fails to actuate a control device (e.g., an electric switch or a control device including a reciprocable member) serving to control the operation of a processing machine for stacks which have advanced beyond the testing station. Furthermore, the failure of the output member to assume its second position when a stack of unsatisfactory thickness is located at the testing station can result in segregation of such defective stack from satisfactory stacks.

The novel features which are considered as characteristic of the invention are set forth in particular in the appended claims. The improved measuring apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
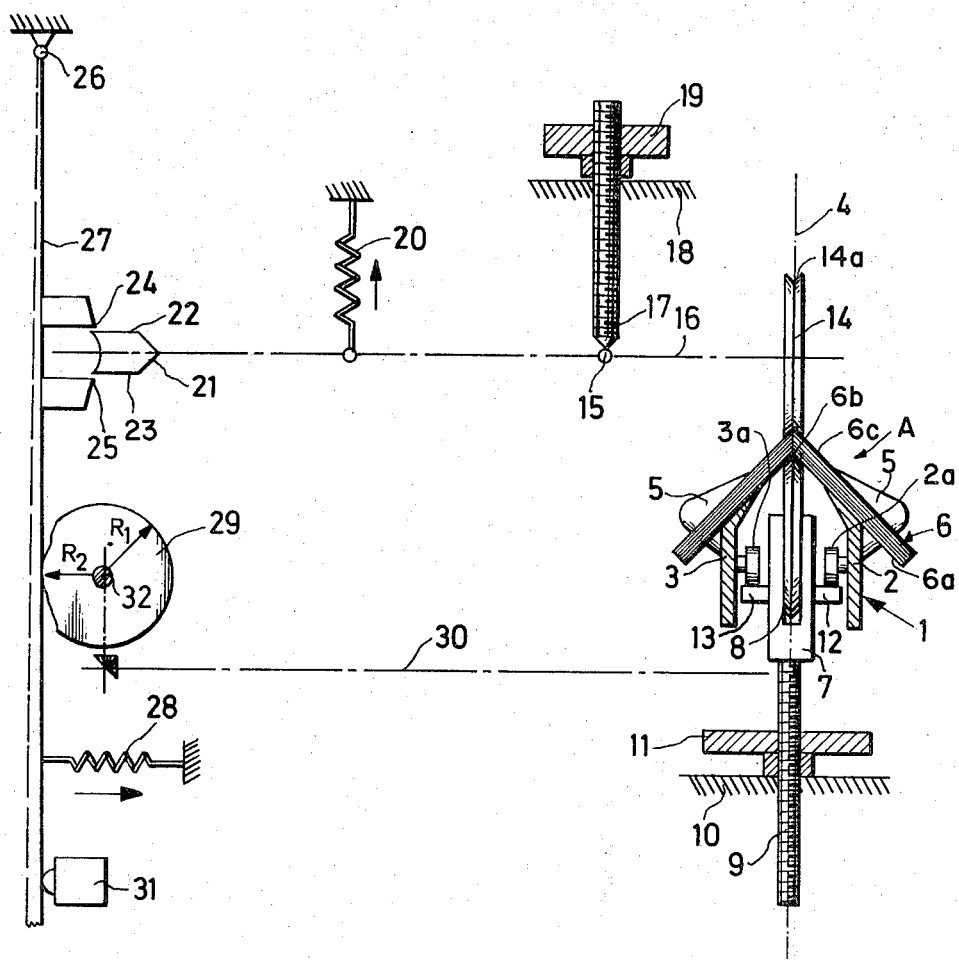
FIG. 1 is a schematic transverse vertical sectional view of a measuring apparatus which embodies one form of the invention.

Referring first to FIG. 1, there is shown a measuring or gauging apparatus which serves to determine the thickness of V-shaped stacks 6 which are transported by a conveyor 1 past a testing station A. The conveyor 1 of the illustrated apparatus is an endless chain having two sections 2, 3 which are mirror symmetrical to each other with reference to a vertical plane 4. The illustrated stack 6 is supported by the upper stretch of the conveyor 1 whose sections 2, 3 are provided with pairs of equidistant entraining members or pushers 5 serving to advance the stacks 6 in a direction at right angles to the plane of FIG. 1 so that successive stacks enter, move through and advance beyond the testing station A. The manner in which the stacks 6 are placed onto or assembled on the upper stretches of the chain sections 2, 3 forms no part of the present invention. The testing station A is followed by at least one processing station (not shown), for example a stapling, stitching or binding station where the stacks 6 are converted into brochures, pamphlets, periodicals, soft- or hard-cover books or the like.

The measuring apparatus further comprises a pair of rotary scanning members in the form of wheels 8 nd 14 respectively located below and above (i.e., at the opposite sides of) the path of stacks 6 on the upper stretches of the conveyor sections 2 and 3. The lower scanning wheel 8 is rotatable in a bifurcated bearing 7 which is secured to or provided with a downwardly extending feed screw 9 meshing with an adjusting wheel 11 which is rotatably supported by a member 10 of the frame. The adjusting wheel 11 is rotatable about its axis but cannot move axially. On the other hand, the feed screw 9 cannot rotate so that it is compelled to move axially in response to rotation of the adjusting wheel 11. The plane 4 is the central symmetry plane of the scanning wheel 8. It will be noted that the profile of the lower scanning wheel 8 matches the configuration of the lowermost sheet 6a of the illustrated stack 6 at the opposite sides of the longitudinally extending fold line 6b of the sheet 6a. The upper scanning wheel 14 has a complementary profile, i.e., it is provided with a V-shaped circumferential groove 14a which receives the median portion of the uppermost sheet 6c in the illustrated stack 6.

The bearing 7 for the lower scanning wheel 8 further carries two elongated rails 12, 13 which respectively serve to guide and support roller followers 2a, 3a of the conveyor sections 2, 3. Thus, when the adjusting wheel 11 is rotated to move the feed screw 9 axially, the movements of the bearing 7 and lower scanning wheel 8 are shared by the guide rails 12, 13 and hence by the conveyor sections 2 and 3.

The upper scanning wheel 14 is rotatably mounted on the shorter right-hand arm of a carrier here shown as a balance beam 16 which is pivotable about the axis of a shaft 15 mounted on the tip of a feed screw 17 which is movable axially (but cannot rotate) in response to rotation of an adjusting wheel 19. The latter is rotatably mounted in a stationary frame member 18. The left-hand arm of the balance beam 16 is baised in a clockwise direction, as viewed in FIG. 1, by a helical spring 20 which is anchored in the frame of the measuring apparatus and serves to bias the upper scanning wheel 14 against the uppermost sheet 6c of the stack 6 therebelow. When the peripheral surface of the scanning wheel 14 engages the uppermost sheet 6c of a stack of satisfactory thickness, its central symmetry plane coincides with the central symmetry plane 4 of the lower scanning wheel 8. When the stack 6 moves beyond the testing station A, the upper scanning wheel 14 is moved into engagement with the lower scanning wheel 8 by the spring 20.

The free end of the longer left-hand arm of the balance beam 16 carries a plate-like first portion 21 of a measuring device the second portion of which includes two blades 24, 25. The plate 21 is provided with two parallel surfaces 22, 23 located in planes which are parallel to the pivot axis (defined by the shaft 15) for the balance beam 16. The planes of the surfaces 22, 23 are normal to the plane of pivotal movement of the balance beam 16 under or against the bias of the spring 20. Still further, the surfaces 22, 23 are at least substantially parallel to the axis or longtiudinal extension of the balance beam 16.

When the upper scanning wheel 14 engages the topmost sheet 6c of a stack 6 of satisfactory thickness, the surfaces 22, 23 of the plate 21 are located substantially midway btween the aforementioned blades 24, 25 which are provided or mounted on a first intermediate portion of an output member here shown as a one-armed lever 27 which is pivotable about the axis of a stationary pivot pin 26 and is biased in a counterclockwise direction, as viewed in FIG. 1, by a helical spring 28. The spring 28 normally maintains a second intermediate portion or follower of the output member or lever 27 in engagement with the periphery of a rotary disk-shaped cam 29 which is driven by a shaft 32 in synchronism with the conveyor 1. The cam 29 has an endless peripheral surface which is tracked by the lever 27, and this peripheral surface has a first portion located at a greater distance from the axis of the shaft 32 (see the radius R1) and a second portion located at a lesser distance from the axis of the shaft 32 (see the radius R2). The operative connection between the drive means for the conveyor 1 and the shaft 32 for the cam 29 is indicated at 30. The drive means for the conveyor 1 may include an electric motor which drives a transmission having a first output element which rotates a sprocket wheel for the conveyor sections 2, 3 and a second output element which drives the shaft 32 by way of the operative connection 30. The arrangement is such that the lever 27 tracks the first portion (radius R1) of the peripheral surface on the cam 29 when a stack 6 has been advanced beyond the testing station A and that the lever 27 tracks the second portion (radius R2) of the peripheral surface on the cam 29 when the upper scanning wheel 14 engages a stack 6 above the lower scanning wheel 8. If the thickness of a stack 6 between the scanning wheels 8, 14 is satisfactory, the lever 27 is free to pivot under the action of the spring 28 to assume the solid-line position of FIG. 1 (in which it tracks the second portion of the peripheral surface on the cam 29) and the surfaces 22, 23 of the plate 21 on the balance beam 16 are then located between (they are flanked by) the blades 24, 25 of the lever 27. This enables the lever 27 to actuate an electric switch 31 of an analogous control device which automatically initiates the operation of a processing machine (not shown) so that the processing machine subjects a stack 6 of satisfactory thickness to a further treatment, e.g., to connect the sheets of such stack by means of one or more staples. If the lever 27 is unable to assume the solid-line position of FIG. 1 when the scanning wheel 14 engages the stack 6 above the scanning wheel 8 because the blade 24 or 25 abuts against the plate 21, this indicates that the thickness of the scanned stack 6 is unsatisfactory. The absence of actuation of the control device 31 by the lever 27 can constitute a different second signal which causes a suitable ejecting or segregating device (not shown) to remove the unsatisfactory stack from the upper stretches of the conveyor sections 2, 3 before the unsatisfactory stack can reach the processing machine.

When a stack 6 has moved beyond the testing station A, the cam 29 causes the lever 27 to assume its broken-line position and to thereby move the blades 24, 25 out of the reach of the plate 21 on the balance beam 16 so that the latter is free to pivot under the action of the spring 20 and moves the upper scanning wheel 14 against the lower scanning wheel 8. The operation of the cam 29 is synchronized with the operation of the conveyor 1 in such a way that a fresh stack 6 reaches the testing station A while the lever 27 still tracks the first portion (radius R1) of the peripheral surface on the cam 29, i.e., while the lever 27 dwells in the broken-line position of FIG. 1. This enables the oncoming stack 6 to move between the scanning wheels 8, 14 and to pivot the balance beam 16 against the opposition of the spring 20 whereby the blades 24, 25 cannot interfere with such pivotal movement of the balance beam 16 because they are located to the left of the plate 21. Undue oscillation of the balance beam 16 in response to entry of a fresh stack 6 between the scanning wheels 8, 14 is prevented by the spring 20 which is preferably installed in an at least slightly prestressed condition. As a stack 6 moves between the scanning wheels 8 and 14, the cam 29 moves the second portion (radius R2) of its peripheral surface against the lever 27 so that, if the thickness of the scanned stack 6 is satisfactory, the spring 28 is free to contract and to move the blades 24, 25 to the positions shown in FIG. 1. If the thickness of the stack 6 is excessive, the plate 21 will stop the blade 25. The plate 21 will stop the blade 24 if the thickness of the scanned stack is less than the lower limit of the satisfactory range. Such range can be determined by appropriate selection of the distance between the blades 24, 25 on the lever 27.

The connection between the control device 31 and the machine at the processing station which receives successive stacks 6 subsequent to passage of such stacks through the testing station A can include a suitable time delay device which insures that the processing machine is actuated when it can treat the corresponding stack 6, namely, that stack whose passage through the station A has caused the control device 31 to produce a signal.

The axis of the shaft 32 is parallel to the axis of the shaft 15 and to the axis of the pivot pin 26. The axes of the feed screws 9, 17 are parallel to the symmetry plane 4 (the axis of the feed screw 9 is located in the plane 4) and normal to the axis of the shaft 15.

If an attendant wishes to change the setup of the measuring apparatus, for example, in such a way that the apparatus is ready for the scanning of thicker stacks on the conveyor 1, the adjusting wheel 11 is rotated in a direction to move the lower scanning wheel 8 downwardly by way of the feed screw 9 and bearing 7. Alternatively, the attendant may decide to rotate the adjusting wheel 19 so as to move the shaft 15 upwardly by way of the feed screw 17. Thus, such change in setup of the measuring apparatus necessitates no adjustment of blades 24, 25 on the output member or lever 27. The change in setup is preferably made while a stack 6, having a desired thickness, dwells at the testing station A and while the lever 27 dwells in the broken-line position of FIG. 1. The attendant then rotates the adjusting wheel 11 and/or 19 until the plate 21 is located exactly or substantially midway between the blades 24, 25. At any rate, the new position of the shaft 15 and/or bearing 7 must be selected in such a way that the plate 21 can be received in the space between the blades 24, 25 when the upper scanning wheel 14 engages a stack of satisfactory thickness and the second portion (radius R2) of the peripheral surface on the cam 29 is adjacent to the lever 27.

In accordance with a presently preferred embodiment, one of the feed screws 9, 17 has coarse external threads (having a large pitch) and the other feed screw has fine external threads (having a smaller pitch). This enables the attendant to carry out coarse adjustments by effecting an axial movement of the one feed screw (for example, the feed screw 9) and to carry out fine or precision adjustments by effecting an axial movement of the other feed screw. The use of such feed screws renders it possible to complete a change in setup within a very short interval of time. If the apparatus is to be used for measuring the thickness of stacks which are thinner than the stack shown in FIG. 1, the attendant will rotate the adjusting wheel 11 in a direction to move the lower scanning wheel 8 upwardly and/or the adjusting wheel 19 in a direction to move the shaft 15 downwardly.

Figure 2:
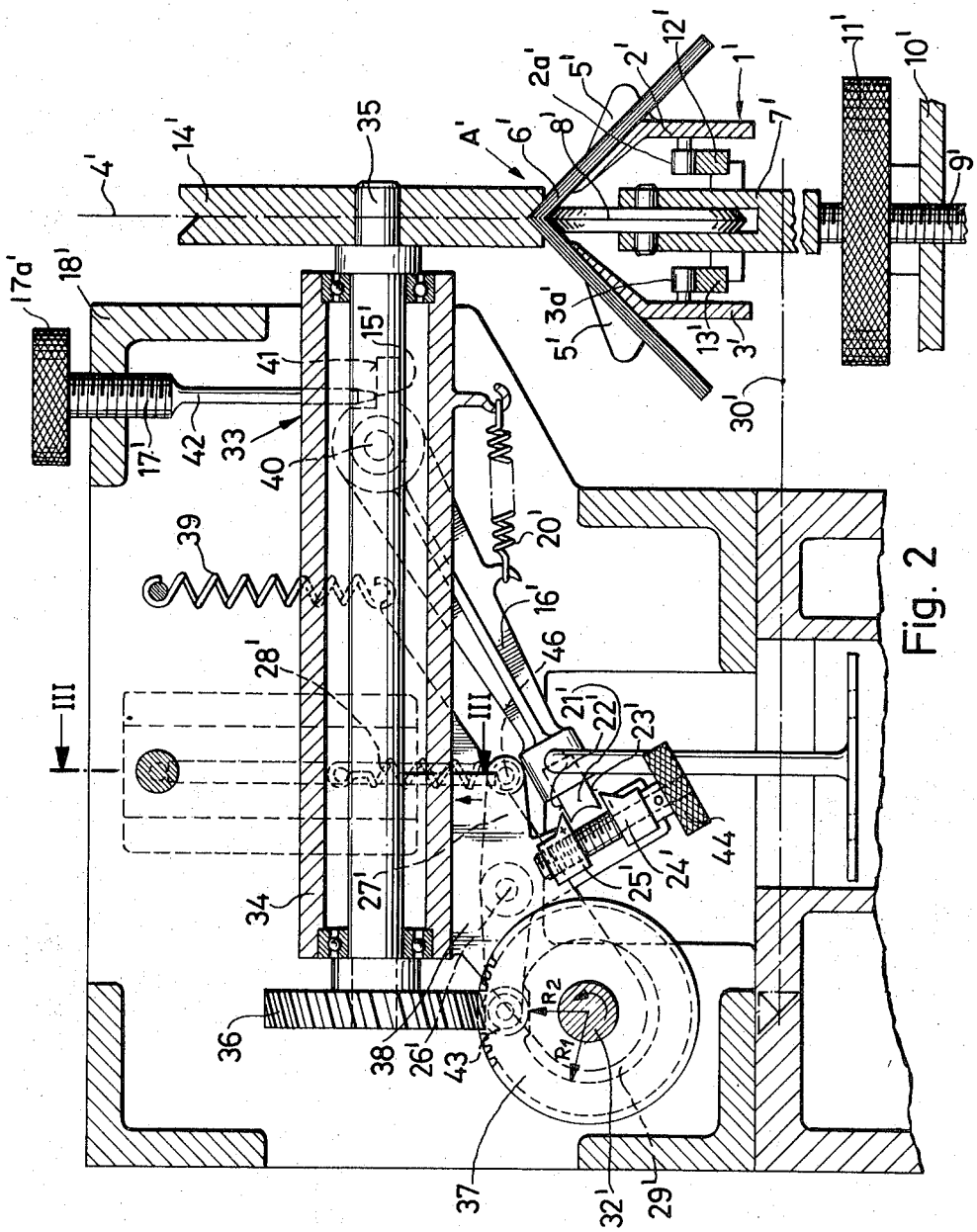
FIG. 2 is a fragmentary transverse vertical sectional view of a second measuring apparatus.
Figure 3:
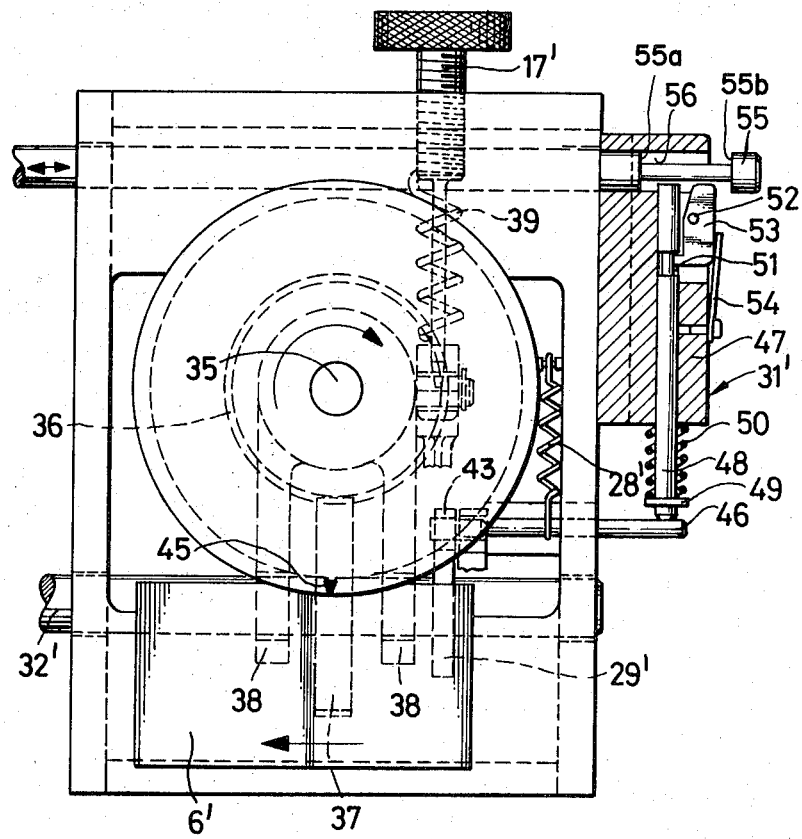
FIG. 3 is a sectional view as seen in the direction of arrows from the line III—III of FIG. 2.

FIGS. 2 and 3 illustrate a modified measuring apparatus which is also used to determine the thickness of stacks 6' on a conveyor 1'. This conveyor is shown as being identical with the conveyor 1 of FIG. 1, i.e., it also comprises two sections 2', 3' which are mirror symmetrical to each other with reference to a plane 4' which is the central vertical symmetry plane of the lower scanning wheel 8'. The conveyor sections 2', 3' are provided with equidistant entraining members or pushers 5' which serve to advance the stacks 6' at equal intervals toward, through and beyond the testing station A' which accommodates the scanning wheel 8' and an upper scanning wheel 14', and thereupon toward a second station where the stacks are subjected to one or more treatments to be converted into brochures, pamphlets or books. Each pusher 5' of the section 2' is aligned with a pusher 5' of the section 3'. These sections are respectively provided with roller followers 2a', 3a' which track two elongated guide rails 12', 13' on the bifurcated bearing 7' for the lower scanning wheel 8'. The manner in which the bearing 7' with the guide rails 12', 13' is movable up or down by way of a feed screw 9' and an adjusting wheel 11' mounted in a frame member 10' is the same as described in connection with FIG. 1.

The upper scanning wheel 14' is rotatably mounted at one end of a driven shaft 35 which is rotatable in antifriction bearings provided in an elongated cylindrical sleeve 34 and together with this sleeve constitutes a carrier 33 for the wheel 14'. The other end of the shaft 35 carries a helical gear 36 which meshes with a complementary gear 37 secured to a shaft 32'. The sleeve 34 of the carrier 33 has two bearing brackets 38 which are pivotable on the shaft 32' so that gear 36 remains in mesh with the gear 37 regardless of the angular position of the carrier 33 with reference to the shaft 32'. The latter is driven in synchronism with the conveyor 1' so that the peripheral speed of the upper scanning wheel 14' equals the forward speed of stacks 6' on the upper stretches of the conveyor sections 2', 3'. A helical spring 39 is attached to the frame of the measuring apparatus and to the sleeve 34 at a point located between the shaft 32' and the scanning wheel 14' whereby the carrier 33 tends to pivot in a clockwise direction, as viewed in FIG. 2. As a rule, the spring 39 is capable of maintaining the shaft 35 for the scanning wheel 14' and the gear 36 in a substantially horizontal position.

The sleeve 34 of the carrier 33 is further provided with a substantially radially extending horizontal pivot pin 40 for a balance beam 16' having a shorter arm 41 and a longer arm which latter carries a plate 21' provided with two parallel surfaces 22', 23'. The short arm 41 of the balance beam 16' abuts against the tip 15' of an abutment or stud 42 under the action of a helical spring 20' which is anchored in the frame of the measuring apparatus. The stud 42 is connected with an adjusting screw 17' having a knurled head 17a' and being in mesh with a stationary frame member 18'. The bias of the spring 20' is sufficiently strong to normally maintain the arm 41 of the balance beam 16' in abutment with the tip 15' of the stud 42. The stud 42 moves its tip 15' vertically upwardly or downwardly in response to rotation of the head 17a' of the adjusting screw 17'. The tip 15' defines a pivot axis for the balance beam 16'.

The surfaces 22', 23' of the plate 21' on the balance beam 16' are parallel to the axis of the pivot pin 40 and normal to the plane of pivotal movement of the balance beam 16' relative to the sleeve 34. Furthermore, the planes of the surfaces 22', 23' are at least substantially parallel to the longitudinal extension of the longer arm of the balance beam 16'.

The one-armed output member or lever 27 of FIG. 1 is replaced with a three-armed output member or lever 27' which is pivotable on a fixedly mounted pin 26'. One arm of the lever 27' carries a roller follower 43 which tracks the peripheral surface of a disk-shaped cam 29' fixedly mounted on the shaft 32'. The configuration of the peripheral surface on the cam 29' is similar to that of the peripheral surface on the cam 29, i.e., such surface includes a first portion (see the radius R1 in FIG. 2) located at a greater first distance from the axis of the shaft 32' and a second portion (see the radius R2 of FIG. 2) located at a lesser second distance from the axis of the shaft 32'. Thus, the cam 29' can pivot the lever 27' between first and second positions in which the follower 43 respectively tracks the first and second surface portions of the cam.

Another arm of the lever 27' is connected with a helical spring 28' which serves to normally maintain the roller follower 43 in engagement with the peripheral surface of the cam 29'. The third arm of the lever 27' carries two blades 24', 25' which can receive the plate 21' therebetween if the upper scanning wheel 14' engages a stack 6' of optimum or at least acceptable thickness. The blade 25' is fixedly mounted on the third arm of the lever 27' and is provided with a transversely extending tapped bore for an adjusting screw 44 which carries the blade 24' in such a way that the blade 24' shares the axial but not the angular movements of the screw 44. By rotating the screw 44, an attendant can select the distance between the blades 24', 25' and hence the range of satisfactory thicknesses of tested stacks 6'.

In order to change the setup of the apparatus for the testing of a series of stacks 6' having a thickness which is greater or less than the thickness of previously tested stacks, the conveyor 1' is arrested while a stack 6' of satisfactory thickness occupies the testing station A' between the scanning wheels 8', 14'. The roller follower 43 of the lever 27' is assumed to be adjacent to the second portion (radius R2) of the peripheral surface on the cam 29'. If the setting is unsatisfactory (i.e., if the blade 24' or 25' abuts against the plate 21'), the attendant rotates the adjusting wheel 11' to effect a coarse adjustment of the lower scanning wheel 8'. The upper scanning wheel 14' is preferably provided with a reference mark or index 45 which is located at the six o'clock position when the wheel 14' engages the stack 6' therebelow. The coarse adjustment by means of the wheel 11' is followed by a precision adjustment through the intermediary of the screw 17' which can pivot the balance beam 16' against the opposition of the spring 20' or allows the spring 20' to pivot the balance beam in a counterclockwise direction, as viewed in FIG. 2. The precision adjustment is terminated when the spring 28' is free to pivot the lever 27' so that the roller follower 43 engages the second portion of the peripheral surface on the cam 29', i.e., when the plate 21' can be received between the blades 24', 25'. This completes the adjustment and the conveyor 1' can be set in motion together with the cam 29'. When the conveyor 1' is running, a fresh stack 6' moves between the scanning wheels 8', 14' during each of a series of successive revolutions of the cam 29', namely, when the roller follower 43 and the lever 27' assume the positions shown in FIG. 2. However, the lever 27' can assume such position only when the wheels 8', 14' scan a satisfactory stack 6'; otherwise, the plate 21' cannot be received between the blades 24', 25' and the lever 27' cannot cause a control device 31' (FIG. 3) to furnish a signal to the apparatus or machine at the processing station. The blades 24', 25' cannot interfere with movements of the balance beam 16' when the roller follower 43 scans the first portion (radius R1) of the peripheral surface on the cam 29'. This insures that the scanning wheel 14' can rise in response to entry of the next stack 6' into the testing station A'. The reference character 30' denotes an operative connection between the drive means for the conveyor 1' and the shaft 32'.

When an oncoming stack 6' lifts the upper scanning wheel 14', the carrier 33 pivots about the axis of the shaft 32' whereby the tip 15' of the stud 42 pivots the balance beam 16' in a clockwise direction, as viewed in FIG. 2, so that the new position of the plate 21' is a function of the thickness of the stack 6' between the scanning wheels 8', 14'. When the stack 6' moves beyond the testing station A', the spring 39 causes the wheel 14' to descend toward the wheel 8'.

The lever 27' is rigidly connected with an actuating rod or trip 46 (see FIG. 3) which is connected with one end of the helical spring 28'. The control device 31' comprises a block-shaped housing 47 serving as a guide for a vertically reciprocable post 48 having close to its lower end a collar 49 which serves as a retainer for a helical spring 50. The spring 50 biases the lower end of the post 48 against the rod 46 of the lever 27'. Close to its upper end, the post 48 is provided with a circumferential groove 51 which can receive the pallet of a pawl 53 pivotably mounted in the housing 47, as at 52. A leaf spring 54 on the housing 47 biases the pallet of the pawl 53 against the post 48. The frame of the measuring apparatus supports a reciprocable bar 55 which forms part of the control device 31' and extends through a transverse hole of the housing 47. The bar 55 is provided with an elongated circumferential groove 56 which can receive the upper end of the post 48. This bar is reciprocated by the drive for the conveyor 1' and cam 29' in synchronism with movements of stacks 6' on the upper stretches of the conveyor sections 2', 3' and serves to control the operation of the processing apparatus. The groove 56 of the rod 55 is flanked by two annular shoulders 55a, 55b.

When the roller follower 43 of the lever 27' tracks the first portion of the peripheral surface on the cam 29', the rod 46 allows the spring 50 to expand and to maintain the post 48 in its lower end position, as viewed in FIG. 3. When the roller follower 43 thereupon tracks the second portion of the peripheral surface on the cam 29', the rod 46 lifts the post 48 and the spring 54 is free to pivot the pawl 53 clockwise so that the pallet of this pawl enters the groove 51. The post 48 is thereby held against downward movement under the bias of the spring 50. The bar 55 is thereupon caused to move in a direction to the right, as viewed in FIG. 3, and its shoulder 55a strikes against and is arrested by the upper end portion of the post 48. After a predetermined interval, the bar 55 begins to move in a direction to the left, as viewed in FIG. 3, whereby its shoulder 55b pivots the pawl 53 counterclockwise so that the pallet of the pawl is expelled from the groove 51 and the spring 50 is free to expand so as to move the post 48 downwardly. However, if the upper scanning wheel 14' engages a stack 6' of unsatisfactory thickness, the plate 21' of the balance beam 16' cannot be received between the blades 24', 25' of the lever 27' and the lever 27' cannot assume that angular position in which the roller follower 43 tracks the second portion (radius R2) of the peripheral surface on the cam 29'. Therefore, the post 48 remains in such axial position that its groove 51 cannot receive the pallet of the pawl 53. Consequently, when the bar 55 again moves in a direction to the right, as viewed in FIG. 3, its left-hand shoulder 55a is not intercepted by the upper end portion of the post 48. In other words, the bar 55 moves beyond its normal right-hand end position and thereby prevents the operation of the associated apparatus or machine at the processing station. For example, such excessive rightward movement of the bar 55 can result in opening of a master switch in the circuit of a motor which drives one or more aggregates of the machine or apparatus at the processing station. When the bar 55 thereupon again moves in a direction to the left, as viewed in FIG. 3, it pivots the pawl 53 counterclockwise but without any effect because the post 48 still dwells in its lower position in which the groove 51 is located at a level below the pallet of the pawl 53. If the thickness of the tested stack 6' is satifactory, the upper end portion of the post 48 invariably extends into the path of movement of the shoulder 55a when the bar 55 moves in a direction to the right so that the bar cannot move beyond its normal righthand end position and the apparatus or machine which is controlled by the bar operates normally.

It is clear that the control device 31' of FIG. 3 can be replaced with a simple electric switch which is closed by the rod 46 when the lever 27' is free to assume the one or the other of its two end positions. Also, the switch 31 of FIG. 1 can be replaced by a control device for generation of pneumatic, mechanical or other signals without departing from the scope of the invention. All that counts is to provide a device which controls a machine or apparatus at a processing station in dependency on the thickness of stacks 6 or 6' which are located at the testing station A or A'.

The lever 27 or 27' can also serve to actuate several switches or the like, for example, a first switch which performs the function of the switch 31 or device 31', and a second switch which controls a segregating or ejecting unit for stacks of unsatisfactory thickness.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. Apparatus for measuring the thickness of stacks of paper sheets or the like, comprising a conveyor arranged to transport a series of equidistant stacks along an elongated path toward, through and beyond a testing station; first and second scanning members disposed at said station at the opposite sides of said path, one of said members being movable away from the other member by successive stacks so that its position is a function of the thickness of the stack at said station; an output member means for moving said output member toward first and second positions which said output member respectively assumes when said conveyor advances a stack beyond said station and when said conveyor transports a stack through said station; and a measuring device including a first portion movable by said one scanning member so that its position when said one scanning member engages a stack is indicative of the thickness of the thus engaged stack, and a second portion provided on said output member and including means cooperating with said first portion for preventing said output member from reaching said second position when a stack having a thickness lying outside of a predetermined satisfactory range passes through said station, said first portion of said measuring device including a plate having two parallel surfaces and said means cooperating with said first portion comprising two blades defining a space having a width which at least equals the distance between said parallel surfaces, said plate extending into said space in the second position of said output member.

2. Apparatus as defined in claim 17, further comprising adjusting means operable to move the other of said scanning members toward and away from said one scanning member.

3. Apparatus as defined in claim 17, wherein said first portion of said measuring device is pivotable about a predetermined axis and further comprising adjusting means operable to change the position of said axis with respect to said other scanning member.

4. Apparatus as defined in claim 1, wherein said output member includes a lever which is pivotable between said first and second positions, said means for moving said lever comprising rotary cam means and means for yieldably biasing said lever against said cam means.

5. Apparatus as defined in claim 1, wherein said output member is a lever which is pivotable about a first axis and said means for moving said output member comprises a cam which is rotatable about a second axis parallel to said first axis, said other scanning member including a wheel rotatable about a third axis which is normal to said first and second axes.

6. Apparatus as defined in claim 1, further comprising an elongated balance beam connected with said one scanning member and supporting said plate, said balance beam being pivotable about a predetermined axis and said surfaces of said plate being parallel with the longitudinal extension of said balance beam and with said predetermined axis.

7. Apparatus as defined in claim 1, further comprising means for controlling the actuation of a device performing some operation on the stacks of paper sheets as they move along the conveyor, said means for controlling being actuatable by said output member in at least one of said positions thereof.

8. Apparatus as defined in claim 7, wherein said means for controlling is actuated by said output member only in the second position of said output member so that said output member fails to actuate said means for controlling when said first portion of said measuring device presents a movement of said output member to said second position.

9. Apparatus as defined in claim 7, wherein said means for controlling includes a reciprocable member and means for limiting the extent of the normal reciprocatory movement of said reciprocable member when said output member is in its second position.

10. Apparatus for measuring the thickness of stacks of paper sheets or the like, comprising a conveyor arranged to transport a series of equidistant stacks along an elongated path toward, through and beyond a testing station; first and second scanning members disposed at said station at the opposite sides of said path, one of said members being movable away from the other member by successive stacks so that its position is a function of the thickness of the stack at said station; an output member; means for moving said output member toward first and second positions which said output member respectively assumes when said conveyor advances a stack beyond said station and when said conveyor transports a stack through said station; and a measuring device including a first portion movable by said one scanning member so that its position when said one scanning member engages a stack is indicative of the thickness of the thus engaged stack, and a second portion provided on said output member and including means cooperating with said first portion for preventing said output member from reaching said second position when a stack having a thickness lying outside of a predetermined satisfactory range passes through said station, said first portion of said measuring device including a plate and said means cooperating with said first portion comprising a pair of spaced apart blades, said second portion of said measuring device further comprising adjusting means for moving one of said blades toward or away from the other blade and said plate being disposed between said blades in the second position of said output member.

11. Apparatus for measuring the thickness of stacks of paper sheets or the like, comprising a conveyor arranged to transport a series of equidistant stacks along an elongated path toward, through and beyond a testing station; first and second scanning members disposed at said station at the opposite sides of said path, one of said members being movable away from the other member by successive stacks so that its position is a function of the thickness of the stack at said station; an output member; means for moving said output member toward first and second positions which said output member respectively assumes when said conveyor advances a stack beyond said station and when said conveyor transports a stack through said station; a measuring device including a first portion connected to and pivotable with said one scanning member about a predetermined axis so that its position when said one scanning member engages a stack is indicative of the thickness of the thus engaged stack, and a second portion provided on said output member and including means cooperating with said first portion for preventing said output member from reaching said second position when a stack having a thickness lying outside of a predetermined satisfactory range passes through said station; first adjusting means operable to change the position of said axis with respect to said other scanning member; and second adjusting means operable to move said other scanning member toward and away from said one scanning member, one of said adjusting means comprising a first axially movable member having external threads of a first pitch and the other of said adjusting means comprising a second axially movable member having external threads of a larger second pitch.

12. Apparatus for measuring the thickness of stacks of paper sheets or the like, comprising a conveyor arranged to transport a series of equidistant stacks along an elongated path toward, through and beyond a testing station; first and second scanning members disposed at said station at the opposite sides of said path, one of said members being movable away from the other member by successive stacks so that its position is a function of the thickness of the stack at said station; a lever pivotable about a first axis; means for pivoting said lever toward first and second positions which said lever respectively assumes when said conveyor advances a stack beyond said station and when said conveyor transports a stack through said station, said means for pivoting said lever comprising a cam which is rotatable about a second axis parallel to said first axis and said other scanning member including a first wheel rotatable about a third axis which is normal to said first and second axes, said one scanning member comprising a second wheel; a shaft connected to and driven by driving means and mounting said second wheel on one end thereof; carrier means rotatably supporting said shaft and being pivotable about said second axis; a balance beam including two arms and being supported by said carrier means for pivotal movement about a fourth axis which is parallel to said first axis; adjustable abutment means for engaging one arm of said balance beam; means for biasing said one arm against said abutment means; and a measuring device including a first portion provided on the other arm of said balance beam and being movable by said second wheel so that its position when said second wheel engages a stack is indicative of the thickness of the thus engaged stack, and a second portion provided on said lever and including means cooperating with said first portion for preventing said lever from reaching said second position when a stack having a thickness lying outside of a predetermined satisfactory range passes through said station.

13. Apparatus as defined in claim 12, wherein said driving means comprises means for rotating said shaft in response to rotation of said cam so that said second wheel is rotated at a peripheral speed which equals the speed of said conveyor.

14. Apparatus as defined in claim 13, wherein said carrier means comprises a sleeve for said shaft and said means for rotating said shaft comprises a gear train including a first gear secured to said cam and a second gear secured to said shaft.

* * * * *